(12) United States Patent
Kobayashi

(10) Patent No.: US 10,528,859 B2
(45) Date of Patent: Jan. 7, 2020

(54) RFID TAG

(71) Applicant: SK-Electronics Co., Ltd., Kyoto-shi (JP)

(72) Inventor: Hideki Kobayashi, Kyoto (JP)

(73) Assignee: SK-Electronics Co., Ltd., Kyoto-shi (JP)

( * ) Notice: Subject to any disclaimer, the term of this patent is extended or adjusted under 35 U.S.C. 154(b) by 0 days.

(21) Appl. No.: 16/093,697

(22) PCT Filed: Apr. 12, 2017

(86) PCT No.: PCT/JP2017/014913
§ 371 (c)(1),
(2) Date: Oct. 15, 2018

(87) PCT Pub. No.: WO2017/179601
PCT Pub. Date: Oct. 19, 2017

(65) Prior Publication Data
US 2019/0080215 A1 Mar. 14, 2019

(30) Foreign Application Priority Data
Apr. 15, 2016 (JP) .................................. 2016-082202

(51) Int. Cl.
*G06K 19/07* (2006.01)
*G06K 19/077* (2006.01)

(52) U.S. Cl.
CPC ... *G06K 19/0724* (2013.01); *G06K 19/07754* (2013.01); *G06K 19/07775* (2013.01); *G06K 19/07786* (2013.01)

(58) Field of Classification Search
CPC ............. G06K 7/0008; G06K 19/0723; G06K 7/10009; G06K 7/10366; G06K 7/10316;
(Continued)

(56) References Cited

U.S. PATENT DOCUMENTS

| 8,009,047 B2 * | 8/2011 | Kanda | G06K 19/07749 340/572.1 |
| 8,424,769 B2 * | 4/2013 | Kato | H01Q 1/2216 235/487 |

(Continued)

FOREIGN PATENT DOCUMENTS

| JP | 2000323643 A | 11/2000 |
| JP | 2008217778 A | 9/2008 |

(Continued)

*Primary Examiner* — Mark S Blouin
(74) *Attorney, Agent, or Firm* — The Webb Law Firm

(57) ABSTRACT

The present invention aims to provide an RFID tag capable of improving antenna efficiency with a simple configuration. Such an RFID tag includes: an antenna configured with a reader/writer; an IC chip to which the antenna is connected; a plurality of connection terminals inside outer peripheral edges of an insulating layer on which the antenna is formed; and an annular antenna-forming area on the entire periphery or substantially the entire periphery of the insulating layer. The antenna is formed into a loop in the antenna-forming area, with one of the plurality of connection terminals serving as a starting point and with one of the remaining connection terminals serving as an endpoint.

8 Claims, 14 Drawing Sheets

(58) Field of Classification Search
CPC ......... G06K 19/07749; G06K 7/10356; G06K 19/0717; G06K 7/10019
USPC ...................................................... 340/10.1
See application file for complete search history.

(56) References Cited

U.S. PATENT DOCUMENTS

| | | | | |
|---|---|---|---|---|
| 9,509,049 B2 * | 11/2016 | Yosui | ........................ | H01Q 7/08 |
| 9,627,760 B2 * | 4/2017 | Tsubaki | ................... | H01Q 7/00 |
| 9,679,240 B2 * | 6/2017 | Ikemoto | ................... | H01Q 1/40 |
| 9,692,128 B2 * | 6/2017 | Kato | ........................ | H01Q 7/00 |
| 9,847,578 B2 * | 12/2017 | Nakano | .................. | H01Q 1/243 |
| 9,917,366 B2 * | 3/2018 | Miura | ....................... | H01Q 7/06 |
| 10,122,068 B2 * | 11/2018 | Kato | .................... | G06K 19/077 |
| 10,236,264 B2 * | 3/2019 | Ikeda | .................. | H01L 21/4853 |
| 2005/0051872 A1 | 3/2005 | Kawamura et al. | | |
| 2008/0191332 A1 | 8/2008 | Koyama et al. | | |
| 2014/0353758 A1 | 12/2014 | Koyama et al. | | |

FOREIGN PATENT DOCUMENTS

| | | | |
|---|---|---|---|
| JP | 2008226070 A | 9/2008 | |
| JP | 4713621 B2 | 4/2011 | |

* cited by examiner

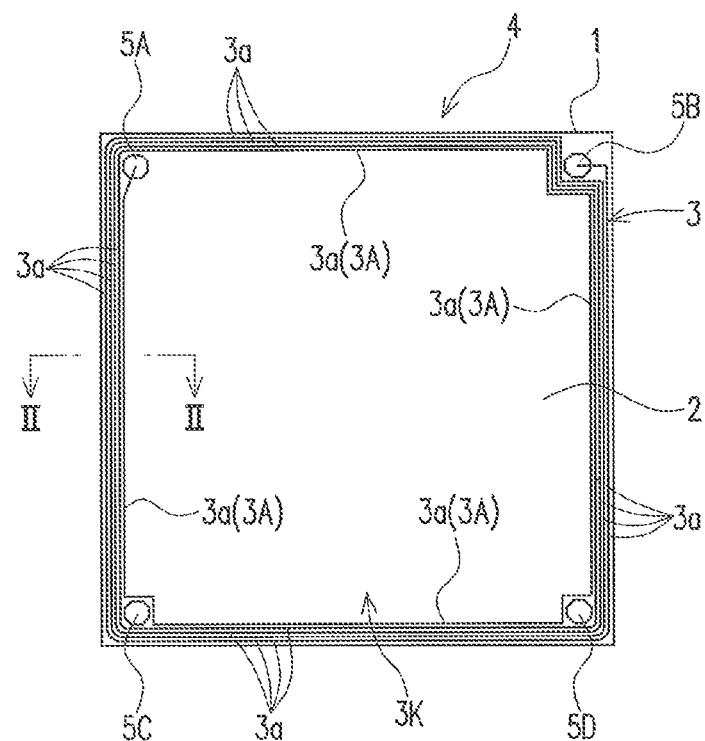

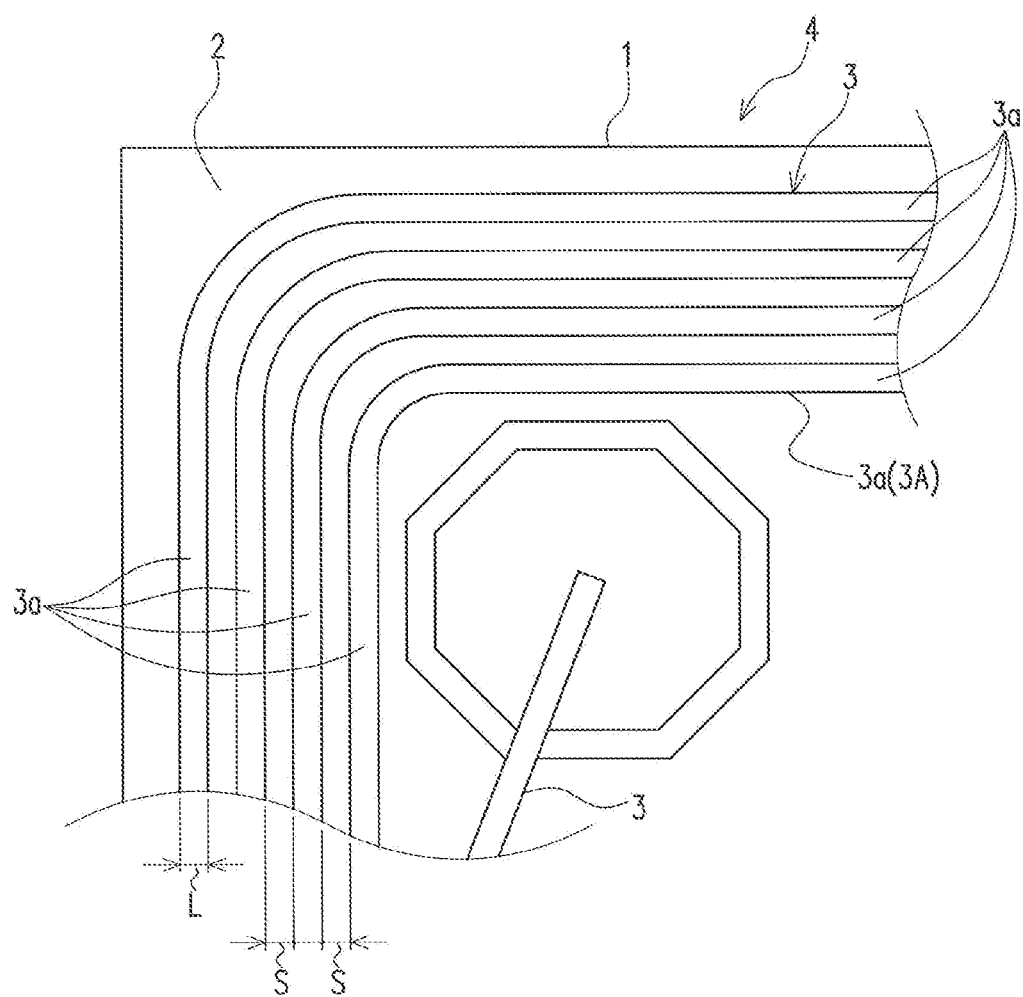

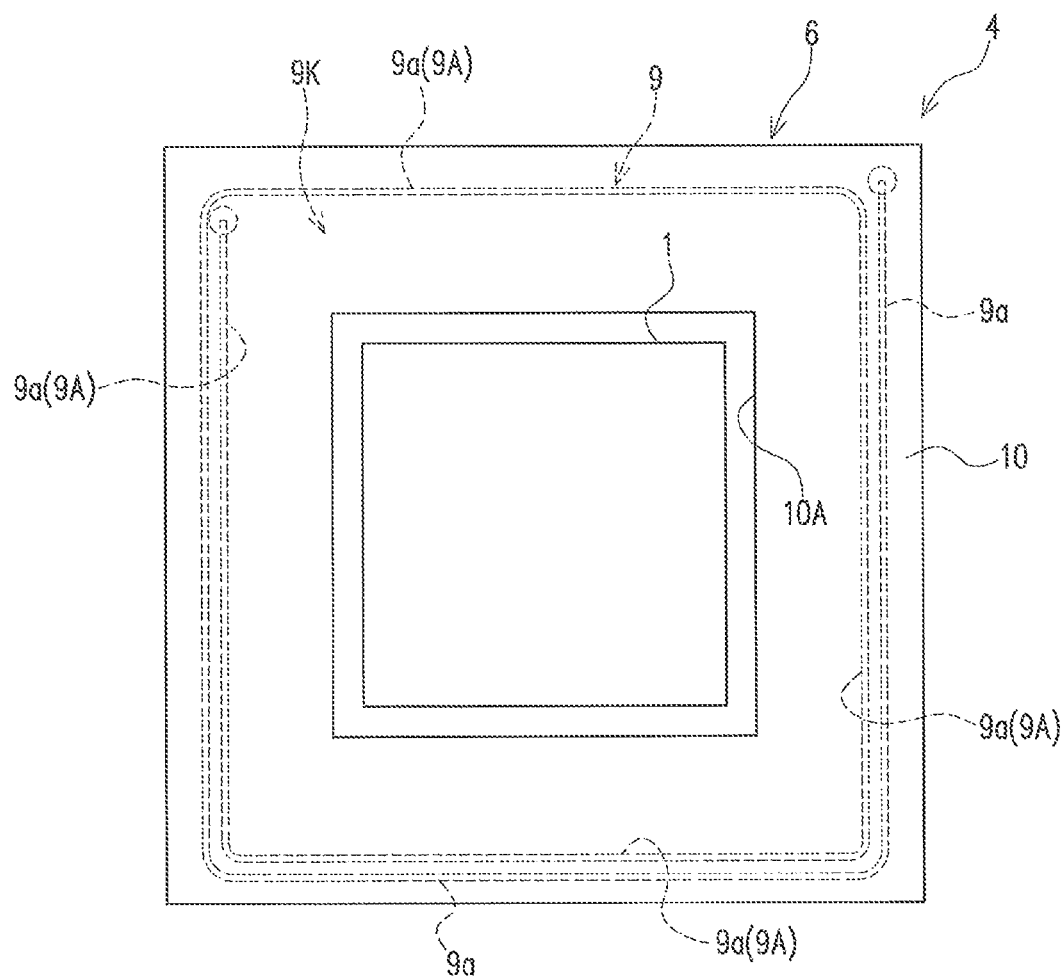

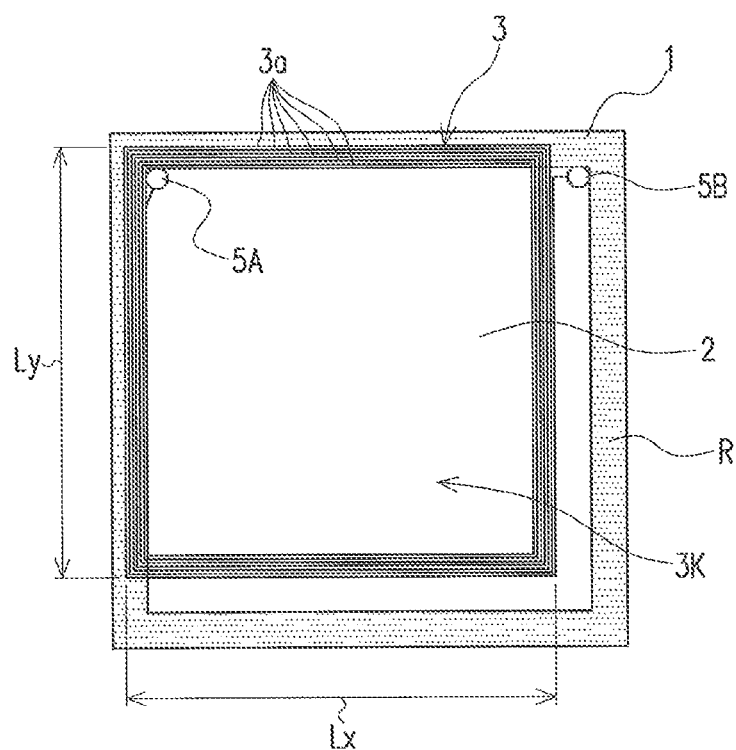

RFID TAG

CROSS-REFERENCE TO RELATED APPLICATIONS

This application is the United States national phase of International Application No. PCT/JP2017/014913 filed Apr. 12, 2017, and claims priority to Japanese Patent Application No. 2016-082202 filed Apr. 15, 2016, the disclosures of which are hereby incorporated in their entirety by reference.

FIELD

The present invention relates to an RFID tag including an antenna for performing non-contact transmission/reception of signals with a reader/writer.

BACKGROUND

Such an RFID tag includes an IC chip configured to record information and an antenna connected to the IC chip. In the RFID tag, wireless communication with the reader/writer is performed by the antenna, and thereby information stored in the IC chip is read out, or information is written in the IC chip.

There has been a growing demand for miniaturizing such RFID tags in recent years, and a miniaturized RFID tag disclosed in Patent Literature 1 is already known, for example, as an RFID tag that meets the demand. The antenna of the RFID tag is constituted by a multilayer antenna stacked over the IC chip and integrally joined thereto. The multilayer antenna includes a base material having substantially the same outer dimensions as the IC chip, a first coil formed on the base material, a second coil stacked on the first coil via an insulation film, and a protective film protecting the second coil.

In the RFID tag of Patent Literature 1, the antenna is a multilayer antenna, and therefore has a large number of turns. As a result, the RFID tag is said to be capable of improving antenna efficiency (such as the communication distance). However, no sufficient communication distance has been achieved yet by the RFID tag, and there is room for improvement.

CITATION LIST

Patent Literature

Patent Literature 1: JP 4713621 B2

SUMMARY

Technical Problem

The present invention has been devised in view of such circumstances, and an object thereof is to provide an RFID tag capable of improving antenna efficiency with a simple configuration.

Solution to Problem

In order to solve the aforementioned problem, an RFID tag of the present invention includes: an antenna configured to perform transmission/reception of signals with a reader/writer; an IC chip to which the antenna is connected; an insulating layer on which the antenna is formed; a plurality of connection terminals inside outer peripheral edges of the insulating layer; and an annular antenna-forming area formed on the entire periphery or substantially the entire periphery of the insulating layer, wherein the antenna is formed into a loop, with one of the plurality of connection terminals serving as a starting point and any one of the remaining connection terminals serving as an endpoint, so that a conductor line is turned within the antenna-forming area, the conductor line has an aspect ratio in a range of 1.0 to 5.0, turns of the conductor line that are adjacent to each other in a radial direction orthogonal to a turned direction of the antenna have substantially the same line width, the line width is set within a range of 2 µm to 7 µm, and a spacing between the turns of the conductor line that are adjacent to each other in the radial direction is set within a range of 2 µm to 7 µm.

In the RFID tag of the present invention, the number of turns in the antenna may be 1.5 to 10.

In the RFID tag of the present invention, the insulating layer may be a package of the IC chip, and the antenna may be provided on the package of the IC chip.

In the RFID tag of the present invention, the insulating layer may be a package of the IC chip, and the RFID tag may further include a booster antenna configured to operate at substantially the same frequency as the antenna set forth.

In the RFID tag of the present invention, the antenna may be configured to perform wireless communication in the UHF band.

BRIEF DESCRIPTION OF DRAWINGS

FIG. 1A is a plan view of an IC chip equipped with an antenna.

FIG. 2A is an enlarged view of the left side of the upper end part of FIG. 1A.

FIG. 3C is a plan view of the IC chip housed in the recess of the booster antenna.

FIG. 8B is a plan view of model 4.

DESCRIPTION OF EMBODIMENTS

Figure 1B:
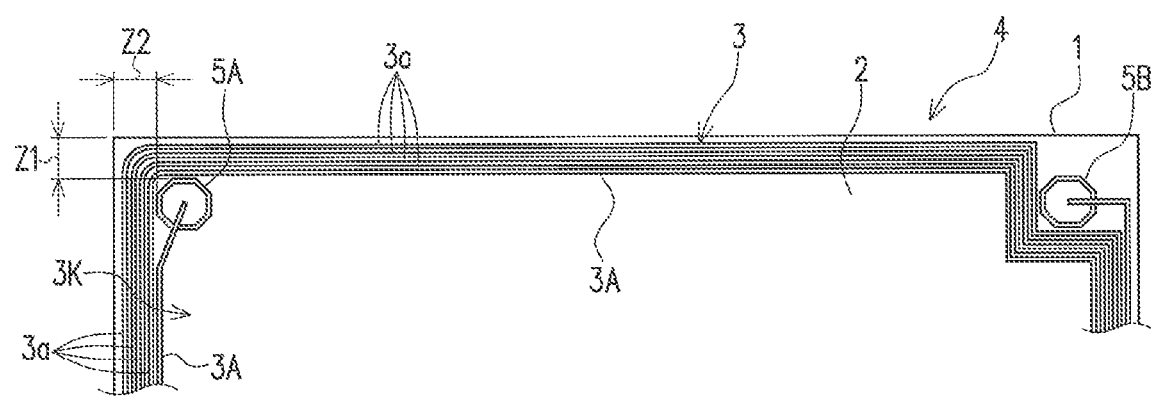
FIG. 1B is an enlarged view of the upper end part of FIG. 1A.

Hereinafter, a first embodiment of the RFID tag of the present invention will be described based on the drawings.

FIG. 1A shows a passive RFID tag 4 in which an antenna 3 is electrically conductively mounted along the outer peripheral edges on the upper surface of a package (an insulating layer made of resin) of an IC chip 1 via an insulating layer 2.

The IC chip 1 has a substantially square shape in plan view. The IC chip 1 may also have a shape such as a circular, elliptical, or polygonal shape.

The IC chip 1 of 0.5 mm square (length 0.5 mm×width 0.5 mm) to 0.9 mm square (length 0.9 mm×width 0.9 mm) can be used, and the IC chip 1 of 0.9 mm square (length 0.9 mm×width 0.9 mm) is used in this embodiment.

The IC chip 1 includes connection terminals 5A, 5B, 5C, and 5D provided inside the outer peripheral edges at the four corners.

Of the four connection terminals, the two connection terminals 5A and 5B disposed on the upper side of the page in FIG. 1A are connected to the antenna. More specifically, one end of the antenna 3 is connected to the input and output terminal 5A on one side (on the upper left side of the page in FIG. 1A), and the other end of the antenna 3 is connected to the input and output terminal 5B on the other side (on the upper right side of the page in FIG. 1A). Of the four connection terminals, the two connection terminals 5C and 5D disposed on the lower side of the page in FIG. 1A are dummy terminals. In the following description of this embodiment, the connection terminal 5A to which the one end of the antenna 3 is connected and the connection terminal 5B to which the other end of the antenna 3 is connected may be referred to as the input and output terminals 5A and 5B, respectively.

The insulating layer 2 is made of polyimide, epoxy resin, silicone resin, or the like, and is formed by spin coating, printing, or lamination. Further, the insulating layer 2 can be formed also by attaching a sheet or a film formed of a photosensitive resin such as photosensitive polyimide.

An annular antenna-forming area is set along substantially the entire outer periphery of the package of the IC chip 1. The reason why such an area is set along substantially the entire outer periphery of the package is that a conductor line 3a connected to the connection terminal 5B is wound inside the connection terminal 5B, not between the connection terminal 5B and the outer peripheral edges of the package, so that the conductor line 3a does not overlap itself that is wound inwardly. Further, the antenna-forming area is set to have a specific width in a direction orthogonal to its circumferential direction.

The antenna 3 has a spiral-shaped conductor pattern formed within the antenna-forming area (inside the outer peripheral edges on the upper surface of the package (installation surface)). The conductor pattern is in a shape that is wound multiple times (4.75 times in FIG. 1A) to be almost rectangular, and the portion where the winding of the conductor pattern starts extends straight from the connection terminal 5B toward an outer peripheral edge of the package and has a shape bending before the outer peripheral edge of the package.

In this embodiment, each round starting from the winding start of the conductor pattern may be referred to as a turn in the description. The innermost portion of the conductor pattern has a length less than one round but will be referred to as a turn in the same manner as the first round to the fourth round.

For the conductor pattern, various conductive materials can be used, where copper, silver, aluminum, and the like can be used, for example. Further, the conductor pattern is formed by various fabrication methods such as a thick-film method in which a conductor paste is applied and baked, sputtering, vapor deposition, vacuum plating, photolithography, and printing.

Each turn of the conductor pattern includes a plurality of sides of the conductor line 3a disposed corresponding to the outer peripheral edges of the upper surface of the package (installation surface). The plurality of sides of conductor line 3a are continuous with each other and are formed into a spiral so as to be turned within the antenna-forming area, with the input and output terminal 5A on one side serving as a starting point and the input and output terminal 5B on the other side serving as an endpoint.

The aspect ratio of the conductor line 3a is set within the range of 1.0 to 5.0. In the antenna 3, the larger the aspect ratio, the larger the cross-sectional area of the conductor line 3a becomes, thereby reducing resistance components of the wiring of the antenna 3, which is preferable for the antenna 3.

When the aspect ratio is over 5.0, production of the antenna 3 becomes difficult. Therefore, the limit value of the aspect ratio in the antenna 3 is 5.0.

When the aspect ratio in the antenna 3 is less than 1.0, the number of turns of the conductor line 3a needs to be increased in order to ensure the resistance value, which results in an increase in the width of the conductor pattern. Accordingly, the number of turns of the conductor line 3a necessary for communication cannot be ensured within the antenna-forming area. Therefore, the minimum value of the aspect ratio is 1.0.

Figure 2B:
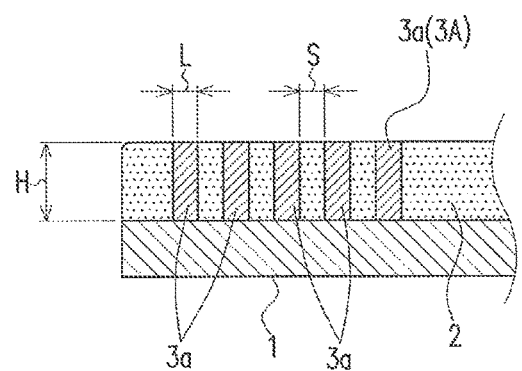
FIG. 2B is a sectional view taken along the line II-II in FIG. 1A.

As shown in FIG. 2B, the aspect ratio is a ratio (H/L) of a long-side length (longitudinal dimension) H with respect to a short-side length (lateral dimension) L in the longitudinal section of the conductor line 3a. In the following description of this embodiment, the normal direction to the installation surface of the antenna 3 may be referred to as the longitudinal direction, and the plane direction of the installation surface of the antenna 3 may be referred to as the lateral direction.

As shown in FIG. 1B, the opening area of an opening 3K of the conductor pattern is an area surrounded by the four sides of the conductor line 3a located on the innermost edges in the radial direction of the conductor line 3a, that is, surrounded by the conductor line 3a included in the fifth turn from the outside of the conductor pattern (which will be hereinafter referred to as first conductor line 3A) (see FIG. 1A).

The line width of the conductor line 3a, that is, the lateral dimension L of the conductor line 3a (see FIG. 2A) is constant or substantially constant across the full length of the conductor line 3a. The line width L of the conductor line 3a can be set to any value within the range of 2 μm to 7 μm and is set to 2 μm in this embodiment.

A spacing (so-called line spacing) S between the turns of the conductor line that are adjacent to each other in the radial direction can be set to any value within the range of 2 μm to 7 μm.

The conductor pattern is formed by the conductor line 3a wound into a spiral shape inside the outer peripheral edges on the upper surface of the IC chip 1.

The conductor line 3a is wound into a spiral with its position shifted inwardly in every round. Therefore, the conductor line 3a is wound into a spiral at the spacing S from the portion of the conductor line 3a already provided on the upper surface of the IC chip 1. In the conductor line 3a, the spacing S has a constant distance at each position in the winding direction.

Since one end of the conductor line 3a is connected to the input and output terminal 5B on the upper right side in FIG. 1A, the winding start portion of the conductor pattern extends from the input and output terminal 5B toward an outer peripheral edge of the package so that the conductor line 3a does not come into contact with itself that is thus connected to the input and output terminal 5B, and the portion following the winding start portion passes inside the input and output terminal 5B.

As described above, the IC chip 1 is 0.9 mm square (length 0.9 mm×width 0.9 mm), and distances Z1 and Z2 from the outermost edges of the IC chip 1 to the input and output terminal 5A (the input and output terminal on the upper left side in FIG. 1B) are 65 μm and 65 μm, respectively. The conductor line 3a in the first turn (one round from the winding start) to the fourth turn of the conductor pattern is disposed so as to pass between the input and output terminal 5A and the outermost edges of the IC chip 1.

The conductor line 3a in the first to fourth turns of the conductor pattern passes also between the two dummy terminals 5C and 5D and the outermost edges of the IC chip 1.

In this way, the conductor line 3a in the first to fourth turns of the conductor pattern is wound into a spiral and sequentially passes outside the connection terminals 5D, 5C, and 5A (between the connection terminals 5D, 5C, and 5A and the outer peripheral edges of the package) and inside the connection terminal 5B, which thereby allows the conductor line 3a to be wound into a spiral so as not to overlap itself in the inward and outward directions.

The conductor line 3a included in the fifth turn of the conductor pattern (that is, the first conductor line 3A) passes inside the dummy terminals 5C and 5D. The number of turns in the antenna is 4.75 but is set to any number from 1.5 to 10 corresponding to the resonance frequency (which is herein 920 MHz).

When the line width L of the conductor line 3a is less than 2 μm, the conductor pattern cannot be produced, and when it exceeds 7 μm, the necessary number of turns cannot be ensured. Therefore, the line width L is set to a value within the range of 2 μm to 7 μm.

Similarly to the line width L of the conductor line 3a, when the spacing (so-called line spacing) S between the turns of the conductor line 3a is less than 2 μm, the conductor pattern cannot be produced, whereas when it exceeds 7 μm, the necessary number of turns cannot be ensured. Therefore, the distance is set to a value within the range of 2 μm to 7 μm.

The distances Z1 and Z2 from the outermost edges of the IC chip 1 to the input and output terminal 5A are not limited to 65 μm and 65 μm, respectively, and can be set to any numerical values within the range of 30 μm to 90 μm, respectively. Further, although the case where the distance Z1 and the distance Z2 from the outermost edges of the IC chip 1 to the input and output terminal 5A are the same as each other is described herein, the distance Z1 and the distance Z2 may be different from each other.

The resonance frequency of the RFID tag configured as above is set to 920 MHz. The resonance frequency f is determined by the following formula:

$$f = 1/2\pi \times \sqrt{(LC)}$$

where L represents the equivalent inductance, and C represents the equivalent capacity of the IC chip generated between the input and output terminals 5A and 5B. The necessary equivalent inductance L of the coil from the aforementioned formula is determined by the following formula:

$$L = 1/(2\pi f)^2 \times C$$

That is, in order to set the resonance frequency f to 920 MHz (which may be any value of 865 MHz to 928 MHz) that is in the UHF band, either value L or C is determined so that the other value L or C is then determined accordingly.

C is a unique value determined for each IC chip 1, and therefore it is necessary to appropriately set the value L based on the value C, and the value L is determined corresponding to the aspect ratio of the conductor line 3a, the line width L, and the spacing S between the turns of the conductor line 3a. These values are set within the aforementioned ranges.

The values of the aspect ratio of the conductor line 3a, the line width L, the spacing S between the turns of the conductor line 3a are set in the aforementioned ranges so that the conductor pattern 3 in which the conductor line 3A or 3a disposed close to the outer peripheral edges of the insulating layer is formed. As a result, it is possible not only to increase the radius of the antenna but also to increase the number of turns. Therefore, the radius of the antenna can be increased while the resistance to the current flowing through the conductor line is suppressed, and thus antenna efficiency (communication distance) can be improved by increasing the antenna gain (gain).

Further, the coil inductance L, a cross-sectional area S of the coil, and the number of turns N have a relation of $L = AN^2 S$, where A represents a constant. From the aforementioned formula, when the number of turns N increases and the cross-sectional area S of the coil increases, it is possible to increase the inductance L and reduce (lower) the resonance frequency.

Next, a method for producing an RFID tag by attaching the antenna 3 to the IC chip 1 will be described.

The upper surface of the IC chip 1 is coated with PI (polyimide) as an insulating layer. Then, the insulating layer is further coated with a seed layer for plating by sputtering. Further, a mold for depositing an antenna pattern is formed over the seed layer using a photoresist.

Subsequently, the process proceeds to a plating step, and the antenna pattern is deposited. Thereafter, the mold layer is removed, and then the exposed unnecessary seed layer is removed. Thereafter, a protective film to protect the antenna pattern is coated with PI (polyimide) to finish the production of the RFID tag.

Figure 3A:
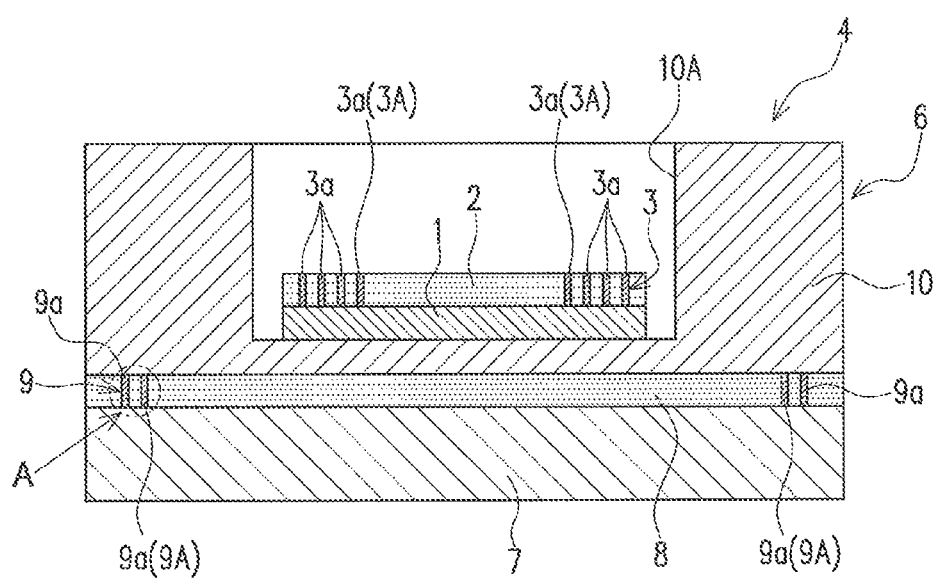
FIG. 3A is a vertical sectional view of an IC chip housed in a recess of a booster antenna.
Figure 3B:
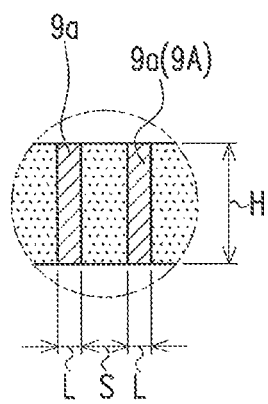
FIG. 3B is an enlarged view of area A of FIG. 3A.

Subsequently, a second embodiment will be described. As shown in FIG. 3A and FIG. 3C, the RFID tag 4 according to this embodiment includes the aforementioned antenna 3 provided on the upper surface of the IC chip 1 and a booster antenna 6 configured to operate at substantially the same frequency. The RFID tag 4 according to this embodiment has an advantage of being capable of enhancing the transmission/reception sensitivity and thereby increasing the information transmission distance, by including the booster antenna 6. The antenna 3 mounted on the IC chip 1 has the same configuration as in FIG. 1A, FIG. 1B, FIG. 2A, and FIG. 2B, and therefore the relevant descriptions are omitted. In FIG. 3B and FIG. 3C, the antenna 3 is not shown.

The booster antenna 6 includes a conductor pattern (antenna) 9 in which a conductor line 9a is wound substantially 1.75 times (which may be multiple turns of 2 times or more up to 5 times) into a spiral on the outer periphery of a ceramic rectangular base 7 (which may be made of other various synthetic resin materials) as an insulating layer (installation plane) via a ceramic insulating layer 8. A ceramic mount 10 having a recess 10A that is rectangular in plan view and is configured to mount the IC chip 1 is formed on the insulating layer 8.

The antenna 9 is configured to resonate at the same frequency as that of the IC chip 1. The antenna 9 performs communication by being electromagnetically coupled to the antenna 3 of the IC chip 1. That is, the IC chip 1 performs communication with a reader/writer via the booster antenna 6. Accordingly, although the size of the antenna 3 of the IC chip 1 is small, the communication distance can be increased by performing communication via the booster antenna 6 that is larger than the antenna 3 of the IC chip 1. The reader/writer is a device capable of communicating with the IC chip 1.

Since the antenna 3 of the IC chip 1 is constituted by an on-chip antenna in which the antenna 3 is integrally formed with the IC chip 1 itself, the need for contact points to connect the IC chip 1 and the antenna 3 to each other is eliminated.

Since the IC chip 1 and the booster antenna 6 are electromagnetically coupled to each other, there is an advantage of being environmentally resistant. For example, when a common RFID tag is used in an environment such as low temperature, high temperature, and vibration, the line may be disconnected in connected portions between the antenna and the IC (including adhesives), narrow-pattern portions of the antenna, or other portions due to vibration or deformation resulting from differences in thermal expansion among the antenna material, the base material, the adhesives, or the like. In contrast, when an RFID tag in which the IC chip 1 including the aforementioned on-chip antenna is combined with the booster antenna 6 electromagnetically coupled thereto is used, the IC chip 1 needs only to be installed around the center of the booster antenna 6 (the recess 10A in FIG. 3A), and therefore the RFID tag can be environmentally resistant, without line disconnection due to thermal expansion or vibration. Note that the IC chip 1 that has been installed around the center of the booster antenna 6 may also be molded with a resin having the same or almost the same coefficient of thermal expansion as ceramics.

As the conductor pattern 9, various conductive materials can be used, where examples thereof can include copper, silver, and aluminum. The conductor pattern 9 is formed by various fabrication methods such as a thick-film method in which a conductor paste is applied and baked, sputtering, vapor deposition, vacuum plating, photolithography, and printing.

As shown in FIG. 3C, the opening area of an opening 9K of the conductor pattern 9 is an area surrounded by the four sides of a first conductor line 9A (see FIG. 3C) located on the innermost peripheral edges, in the conductor line 9a located in the radial direction.

The turns of the conductor line 9a that are adjacent to each other in the radial direction have substantially the same line width, that is, substantially the same short-side length (lateral dimension) L. Further, the number of turns in the antenna is 1.75, but the number of turns is preferably any of 1.5 to 10.

Figure 4:
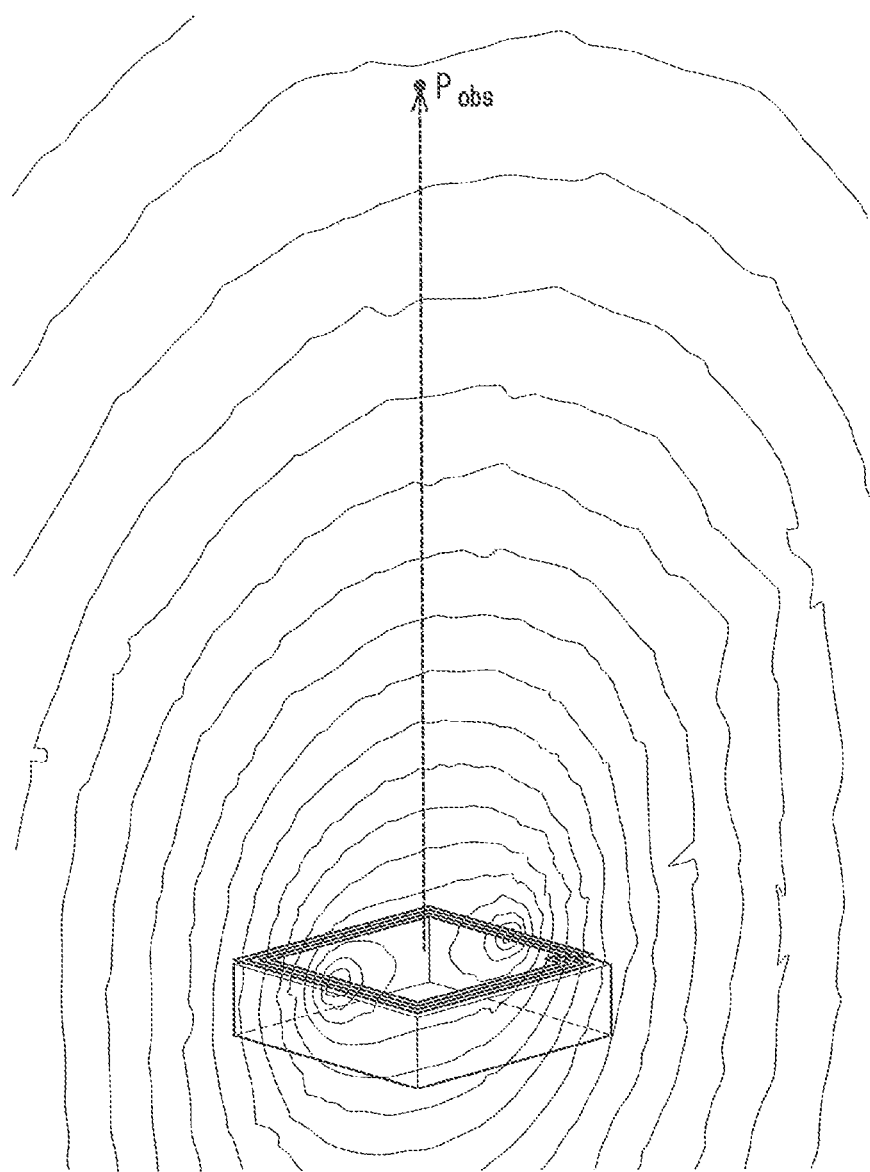
FIG. 4 is an explanatory diagram illustrating the magnetic field calculated by electromagnetic field simulations with contour lines.

The RFID tag 4 of the present invention shown in FIG. 1A, FIG. 1B, FIG. 2A, and FIG. 2B has a conductor pattern with 4.75 turns, but the RFID tag of the present invention may have a conductor pattern with 5.75 turns. The following will examine three types of RFID tags of the present invention having different specifications (with the same number of the turns of 5.75), and other four types of RFID tags having specifications that are partially different from the specifications of the RFID tags of the present invention as comparative examples, by making graphs of the amplitudes of the respective magnetic fields calculated by electromagnetic field simulations. FIG. 4 shows the magnetic field calculated by electromagnetic field simulations with contour lines. In FIG. 4, a point located at a distance of 2 mm in the Z-axis direction from the center of the package of the RFID tag is referred to as $P_{obs}$, and the magnetic field at the point $P_{obs}$), is calculated every 20 MHz from 715 MHz to 1115 MHz. These calculated values are plotted on a graph, with the horizontal axis representing the frequency (GHz) and the vertical axis representing the amplitude (A.U.) of the magnetic field. Here, the amplitude of the magnetic field at 915 MHz that is the operating frequency is important, and the larger the value of the amplitude, the more the communication distance is improved.

Figure 5A:
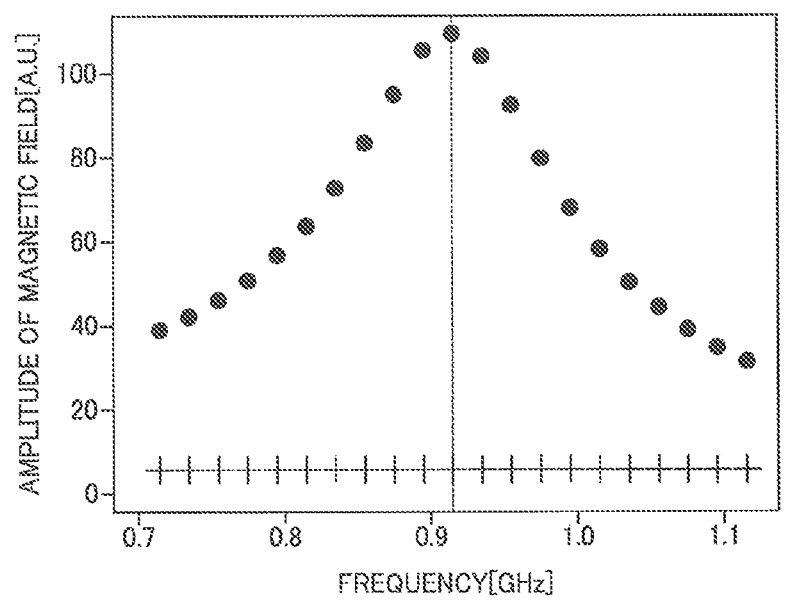
FIG. 5A is a graph showing the amplitudes of the magnetic fields with respect to the frequencies, of the present invention 1 and model 1.

In FIG. 5A, the data of the RFID tag of the present invention 1 are plotted with black dots, and the data of the RFID tag of model 1 as a comparative example are plotted with "+". In the RFID tag of the present invention 1, the antenna is disposed in the antenna-forming area between the outer peripheral edges of the insulating layer and the plurality of connection terminals, the aspect ratio is set to 1.25, the line width of the turns of the conductor line 3a that are adjacent to each other in the radial direction is set to 4 μm, the spacing (so-called line spacing) S between the turns of the conductor line 3a from each other is set to 2.83 μm, and the number of turns is set to 5.75. In contrast, in the RFID tag of model 1, the antenna is disposed in the antenna-forming area between the outer peripheral edges of the insulating layer and the plurality of connection terminals, the aspect ratio is set to 1.25, the line width of the turns of the conductor line 3a that are adjacent to each other in the radial direction is set to 10 μm (which is a value out of the range of the present invention), the spacing (so-called line spacing) S between the turns of the conductor line 3a from each other is set to 8 μm (which is a value out of the range of the present invention), and the number of turns is set to 1.75.

Figure 5B:
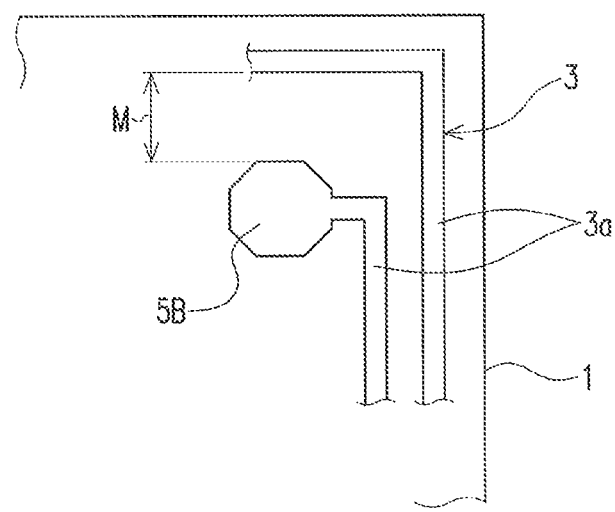
FIG. 5B is a plan view showing the periphery of an input and output terminal of model 1.

The reason why the number of turns in the conductor pattern is 1.75 is that, when a conductive material having a line width of 10 μm is wound once, as shown in FIG. 5B, a distance M between the conductor line 3a and the connection terminal 5B is 25 μm. In contrast, in the case where a conductive material in which the distance between the turns of the conductor is 8 μm and the line width is 10 μm is wound twice, the spacing between the turns of the conductor line 3a needs to be ensured also from the connection terminal 5B, and therefore a line width of 10 μm+distances between turns of conductor of 8μ×2=26 μm is needed, which exceeds 25 μm that is the distance M. Thus, such a conductive material cannot be wounded twice.

Therefore, the number of turns of the conductor pattern is limited up to 1.75. The graph of FIG. 5A shows that, while the size of the magnetic field of the RFID tag of the present invention 1 at 915 MHz that is the operating frequency is a value over 100 (A.U.), the size of the magnetic field of the RFID tag of model 1 at 915 MHz that is the operating frequency is less than 10 (A.U.), resulting that the communication distance of the RFID tag of the present invention 1 can be increased as compared with that of the RFID tag of model 1. In the RFID tag of model 1, the line width of the conductor line 3a and the spacing between the turns of the conductor line 3a are out of the ranges of the present invention, and it is important that the line width falls within the range of 2 μm to 7 μm, and that the spacing between the turns of the conductor line 3a falls within the range of 2 µm to 7 µm, as in the present invention.

Figure 6:
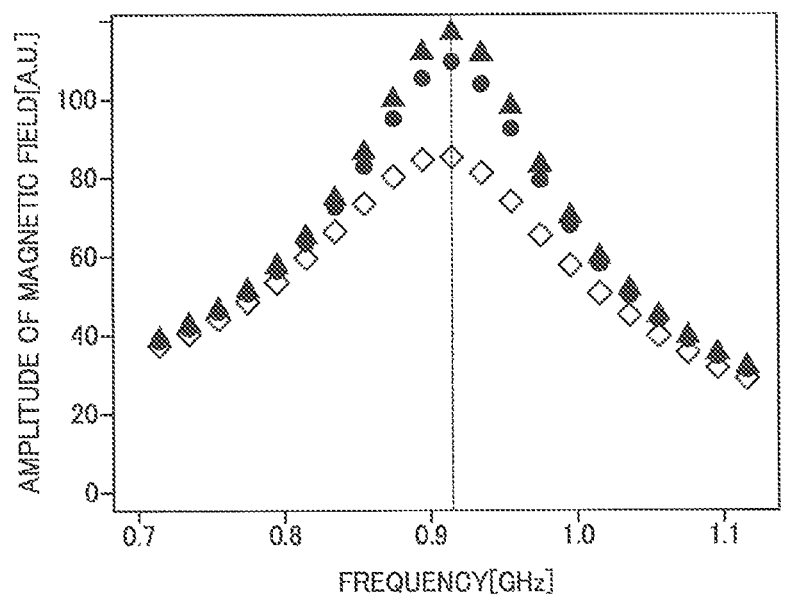
FIG. 6 is a graph showing the amplitudes of the magnetic fields with respect to the frequencies, of the present inventions 1 and 2 and model 2.

In FIG. 6, the data of the RFID tag of the present invention 1 are plotted with black dots, the data of the RFID tag of the present invention 2 having a different specification from the RFID tag of the present invention 1 are plotted with black triangles, and the data of an RFID tag as a comparative example having a different specification from model 1 are plotted with outlined rhombuses.

In the RFID tag of the present invention 1, the antenna is disposed in the antenna-forming area between the outer peripheral edges of the insulating layer and the plurality of connection terminals, as described above, the aspect ratio is set to 1.25, the line width of the turns of the conductor line 3a that are adjacent to each other in the radial direction is set to 4 µm, the spacing (so-called line spacing) S between the turns of the conductor line 3a from each other is set to 2.83 µm, and the number of turns in the conductor pattern is set to 5.75.

Further, in the RFID tag of the present invention 2, the antenna is disposed in the antenna-forming area between the outer peripheral edges of the insulating layer and the plurality of connection terminals, in the same manner as in the RFID tag of the present invention 1, the aspect ratio is set to 2.5 (a value different from that in the present invention 1), the line width of the turns of the conductor line 3a that are adjacent to each other in the radial direction is set to 4 µm (the same value as that in the present invention 1), the spacing (so-called line spacing) S between the turns of the conductor line 3a from each other is set to 2.29 µm (a value different from that in the present invention 1), and the number of turns in the conductor pattern is set to 5.75.

In contrast, in the RFID tag of model 2, the antenna is disposed in the antenna-forming area between the outer peripheral edges of the insulating layer and the plurality of connection terminals, in the same manner as in the present invention 1, the aspect ratio is set to 0.5, the line width of the turns of the conductor line 3a that are adjacent to each other in the radial direction is set to 4 µm (which is a value within the range of the present invention), the spacing (so-called line spacing) S between the turns of the conductor line 3a from each other is set to 3 µm (which is a value within the range of the present invention), and the number of turns in the conductor pattern is set to 5.75.

The graph of FIG. 6 shows that, while the size of the magnetic field of the RFID tag of each of the present invention 1 and the present invention 2 at 915 MHz that is the operating frequency is a value over 100 (A.U.), the size of the magnetic field of the RFID tag of model 2 at 915 MHz that is the operating frequency is nearly 80 (A.U.), resulting that the communication distance of the RFID tag of each of the present invention 1 and the present invention 2 can be increased as compared with that of the RFID tag of model 2. In the RFID tag of model 2, only the aspect ratio is out of the range of 1.0 to 5.0, which is the range of the aspect ratio of the present invention, and it is important that the aspect ratio is set within the range of 1.0 to 5.0, as in the present invention.

Figure 7:
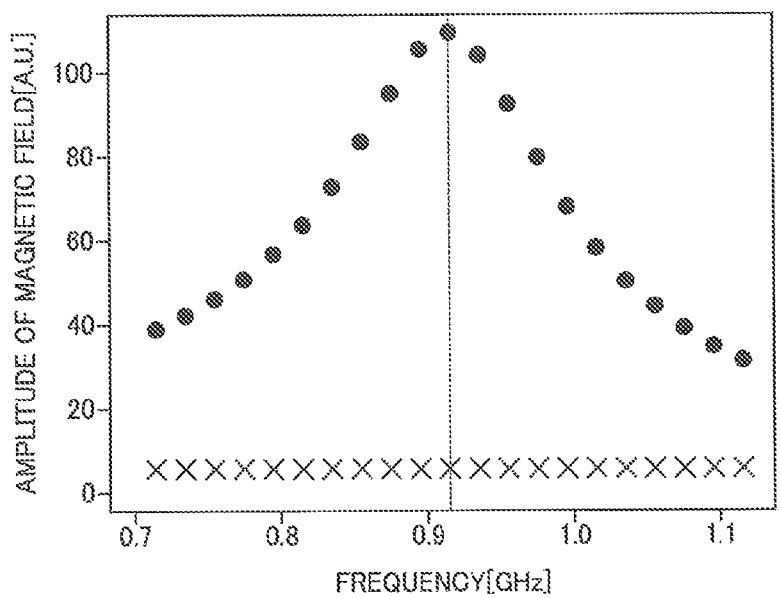
FIG. 7 is a graph showing the amplitudes of the magnetic fields with respect to the frequencies, of the present invention 1 and model 3.

In FIG. 7, the data of the RFID tag of the present invention 1 are plotted with black dots, and the data of the RFID tag of model 3 as a comparative example are plotted with "×". In the RFID tag of the present invention 1, the antenna is disposed in the antenna-forming area between the outer peripheral edges of the insulating layer and the plurality of connection terminals, as described above, the aspect ratio is set to 1.25, the line width of the turns of the conductor line 3a that are adjacent to each other in the radial direction is set to 4 µm, the spacing (so-called line spacing) S between the turns of the conductor line 3a from each other is set to 2.83 µm, and the number of turns in the conductor pattern is set to 5.75.

In contrast, in the RFID tag of model 3, the antenna is disposed in the antenna-forming area between the outer peripheral edges of the insulating layer and the plurality of connection terminals, the aspect ratio is set to 0.5 (which is a value out of the range of the present invention), the line width of the turns of the conductor line 3a that are adjacent to each other in the radial direction is set to 10 µm (which is a value out of the range of the present invention), the spacing (so-called line spacing) S between the turns of the conductor line 3a from each other is set to 8 µm (which is a value out of the range of the present invention), and the number of turns in the conductor pattern is set to 1.75 as in model 1. The graph of FIG. 7 shows that, while the size of the magnetic field of the RFID tag of the present invention 1 at 915 MHz that is the operating frequency is a value over 100 (A.U.), the size of the magnetic field of the RFID tag of model 3 at 915 MHz that is the operating frequency is less than 10 (A.U.), resulting that the communication distance of the RFID tag of the present invention 1 can be increased as compared with that of the RFID tag of model 3.

In the RFID tag of model 3, all values of the aspect ratio, the line width of the conductor line 3a, and the spacing between the turns of the conductor line 3a are out of the ranges of the present invention, and it is important that the aspect ratio falls within the range of 1.0 to 5.0, the line width of the conductor line 3a falls within the range of 2 µm to 7 µm, and the spacing between the turns of the conductor line falls within the range of 2 µm to 7 µm, as in the present invention.

Figure 8A:
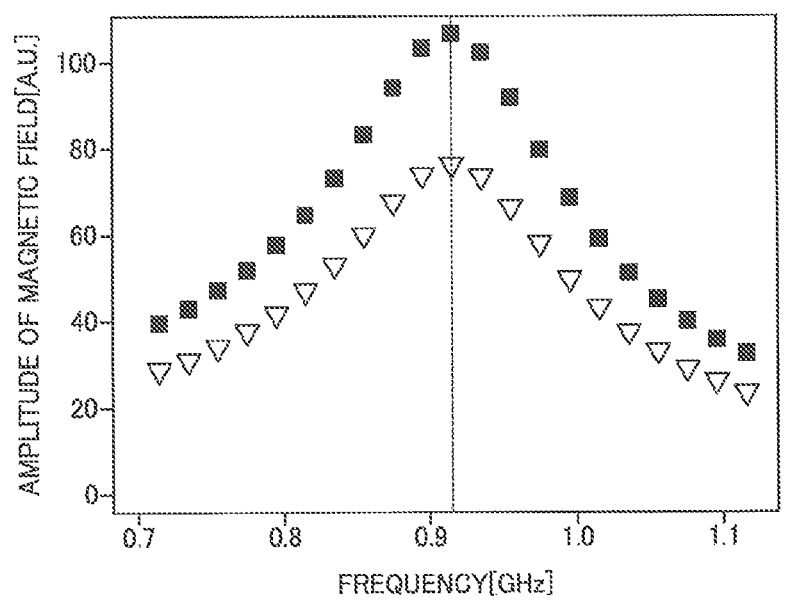
FIG. 8A is a graph showing the amplitudes of the magnetic fields with respect to the frequencies, of the present invention 3 and model 4.

In FIG. 8A, the data of the RFID tag of the present invention 3 having a different specification from the specification of the present invention 1 and the specification of the present invention 2 are plotted with black squares, and the data of the RFID tag of model 4 as a comparative example are plotted with outlined downward triangles.

In the RFID tag of the present invention 3, the antenna is disposed in the antenna-forming area between the outer peripheral edges of the insulating layer and the plurality of connection terminals, as described above, the aspect ratio is set to 1.67 (a value different from the values in the present inventions 1 and 2), the line width of the turns of the conductor line 3a that are adjacent to each other in the radial direction is set to 3 µm (a value different from the values in the present inventions 1 and 2), the spacing (so-called line spacing) S between the turns of the conductor line 3a from each other is set to 3.9 µm (a value different from the values in the present inventions 1 and 2), and the number of turns in the conductor pattern is set to 5.75.

In contrast, in the RFID tag of model 4, the antenna is disposed to be located in almost half of an antenna-forming area R between the outer peripheral edges of the insulating layer and the two input and output terminals 5A and 5B, as shown in FIG. 8B, the aspect ratio is set to 1.67 (within the range of the present invention), the line width of the turns of the conductor line 3a that are adjacent to each other in the radial direction is set to 3 µm (within the range of the present invention), the spacing (so-called line spacing) S between the turns of the conductor line 3a from each other is set to 2.5 µm (within the range of the present invention), and the number of turns in the conductor pattern is set to 5.75.

The graph of FIG. 8A shows that, while the size of the magnetic field of the RFID tag of the present invention 3 at 915 MHz that is the operating frequency is a value over 100

(A.U.), the size of the magnetic field of the RFID tag of model 4 at 915 MHz that is the operating frequency is nearly 75 (A.U.), resulting that the communication distance of the RFID tag of the present invention 3 can be increased as compared with that of the RFID tag of model 4. This is considered to be because in the RFID tag of model 4, almost half of the antenna 3 is disposed in an area shifted inwardly out of the antenna-forming area R formed on the outer periphery of the IC chip 1 and therefore the outer diameter dimension of the antenna 3 is reduced.

The present invention is not limited to the aforementioned embodiments, and various modifications can be made without departing from the gist of the present invention.

In the aforementioned embodiments, the antenna-forming area is formed over substantially the entire periphery of the insulating layer by winding the conductor line 3a inside the input and output terminal 5B so that the conductor line 3a wound inwardly does not overlap itself that is connected to the input and output terminal 5B, but the antenna-forming area may be formed over the entire periphery of the insulating layer by winding it so that the conductor line 3a wound inwardly overlaps itself that is connected to the input and output terminal 5B. In this case, in order to avoid the conductor line 3a overlapping itself (i.e., a portion of the conductor line 3a connected to the input and output terminal 5B and a portion of the conductor line 3a wound inwardly) from coming into contact with itself in the vertical direction, the insulating layer is formed so that one of the portions of the conductor line 3a is moved upward apart from the other portion and the conductor line 3a that has been moved upward is maintained at the position.

Further, in the aforementioned embodiments, the antenna is configured by disposing the conductor line 3a into a spiral in parallel, but the antenna that is wound multiple times may be configured by stacking two or more of single layers formed by disposing the conductor line 3a into a loop on the insulating layer.

Further, in the aforementioned embodiments, the antenna is formed on the upper surface of the package of the IC chip, but the antenna may be formed on a substrate provided to mount the IC chip. Such an embodiment is carried out by providing a plurality of connection terminals for being connected to the IC chip on the substrate.

REFERENCE SIGNS LIST

1: IC chip
2: Insulating layer
3: Antenna (conductor pattern)
3a: Conductor line
3A: First conductor line
3K: Opening
4: RFID tag
5A, 5B: Input and output terminal (connection terminal)
5C, 5D: Dummy terminal
6: Booster antenna
7: Table
8: Insulating layer
9: Conductor pattern (antenna)
9a: Conductor line
9A: First conductor line
9K: Opening
10: Mount
10A: Recess
H: Long-side length
L: Short-side length (line width)
S: Spacing
Z1, Z2: Distance

The invention claimed is:

1. An RFID tag comprising:
an antenna configured to perform transmission/reception of signals with a reader/writer;
an IC chip to which the antenna is connected;
an insulating layer on which the antenna is formed;
a plurality of connection terminals inside outer peripheral edges of the insulating layer; and
an annular antenna-forming area formed on the entire periphery or substantially the entire periphery of the insulating layer,
wherein the antenna is formed into a loop, with one of the plurality of connection terminals serving as a starting point and any one of the remaining connection terminals serving as an endpoint, so that a conductor line is turned within the antenna-forming area,
wherein the conductor line is formed to have a vertical cross section with a vertical dimension thereof being larger than a horizontal dimension thereof,
wherein turns of the conductor line that are adjacent to each other in a radial direction orthogonal to a turned direction of the antenna have substantially the same line width,
wherein the line width is set within a range of 2 µm to 7 µm,
wherein a spacing between the turns of the conductor line that are adjacent to each other in the radial direction is set within a range of 2 µm to 7 µm,
wherein the insulating layer is a package of the IC chip,
wherein the antenna is provided on an upper surface of the package of the IC chip,
wherein the IC chip is formed into a rectangular shape, and
wherein the plurality of connection terminals are provided inside the outer peripheral edges at corners of the insulating layer on which the antenna is formed.

2. The RFID tag according to claim 1, wherein the number of turns in the antenna is 1.5 to 10.

3. The RFID tag according to claim 2, wherein
the antenna is a booster antenna configured to operate at substantially the same frequency as the antenna of the IC chip.

4. The RFID tag according to claim 2, wherein
the antenna-forming area is formed over substantially the entire periphery of the insulating layer, and
the antenna is formed so that the conductor line is wound inside one of the plurality of connection terminals to which the outermost turn of the conductor line is connected to prevent the outermost turn of the conductor line connected to the connection terminal from coming into contact with the remaining turns of the conductor line wound inside the outermost turn of the conductor line.

5. The RFID tag according to claim 3, wherein
the antenna-forming area is formed over substantially the entire periphery of the insulating layer, and
the antenna is formed so that the conductor line is wound inside one of the plurality of connection terminals to which the outermost turn of the conductor line is connected to prevent the outermost turn of the conductor line connected to the connection terminal from coming into contact with the remaining turns of the conductor line wound inside the outermost turn of the conductor line.

6. The RFID tag according to claim 1, wherein
the antenna is a booster antenna configured to operate at substantially the same frequency as the antenna of the IC chip.
7. The RFID tag according to claim 6, wherein
the antenna-forming area is formed over substantially the entire periphery of the insulating layer, and
the antenna is formed so that the conductor line is wound inside one of the plurality of connection terminals to which the outermost turn of the conductor line is connected to prevent the outermost turn of the conductor line connected to the connection terminal from coming into contact with the remaining turns of the conductor line wound inside the outermost turn of the conductor line.
8. The RFID tag according to claim 1, wherein
the antenna-forming area is formed over substantially the entire periphery of the insulating layer, and
the antenna is formed so that the conductor line is wound inside one of the plurality of connection terminals to which the outermost turn of the conductor line is connected to prevent the outermost turn of the conductor line connected to the connection terminal from coming into contact with the remaining turns of the conductor line wound inside the outermost turn of the conductor line.

* * * * *